C. G. FLEMING.
TRACTOR.
APPLICATION FILED OCT. 17, 1914.
1,173,942.
Patented Feb. 29, 1916.
2 SHEETS—SHEET 1.
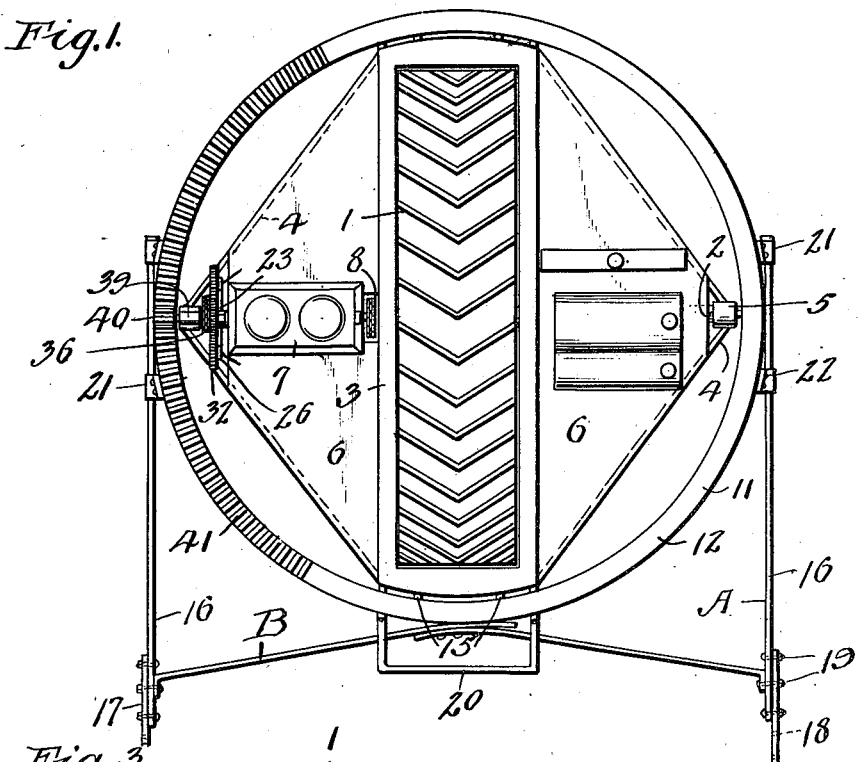
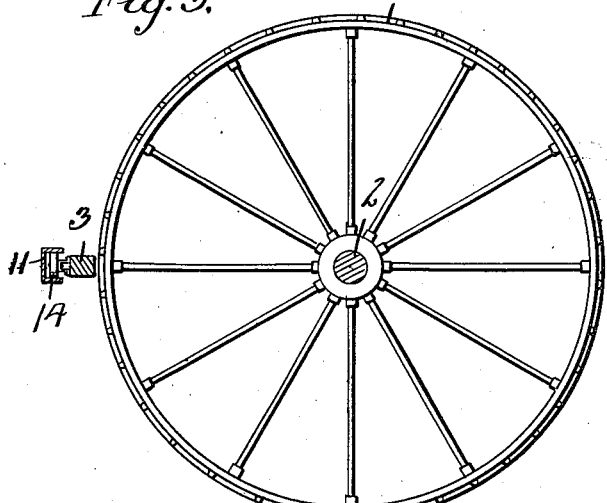
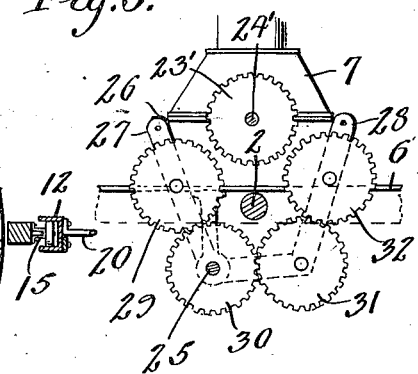
Witnesses
Inventor
C. G. Fleming,
By Victor J. Evans
Attorney

C. G. FLEMING.
TRACTOR.
APPLICATION FILED OCT. 17, 1914.

1,173,942.

Patented Feb. 29, 1916.
2 SHEETS—SHEET 2.

Witnesses

Inventor
C. G. Fleming,
By Victor J. Evans
Attorney

UNITED STATES PATENT OFFICE.

CLARENCE G. FLEMING, OF PHILLIPS, NEBRASKA.

TRACTOR.

1,173,942. Specification of Letters Patent. Patented Feb. 29, 1916.

Application filed October 17, 1914. Serial No. 867,189.

*To all whom it may concern:*

Be it known that I, CLARENCE G. FLEMING, a citizen of the United States, residing at Phillips, in the county of Hamilton and State of Nebraska, have invented new and useful Improvements in Tractors, of which the following is a specification.

This invention relates to tractors, the primary object of the invention being to provide a motor propelled tractor device embodying one or more traction wheels and adapted to be connected to any kind of wheeled vehicle or farming implement, the improved tractor embodying in connection with the motor and driving mechanism, mechanism which will enable the tractor to be steered to one side or the other as required.

With the above and other objects in view, the invention consists in the novel construction, combination and arrangement of parts, as will hereinafter be more fully described, illustrated and claimed.

Figure 2:
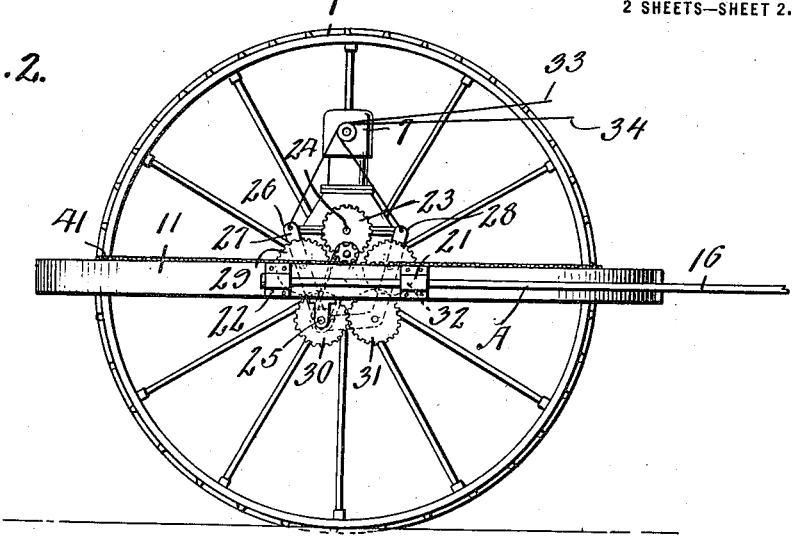
Figure 4:
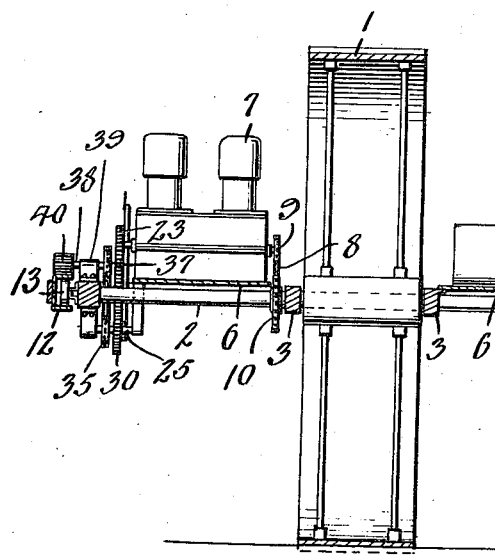
Figure 6:
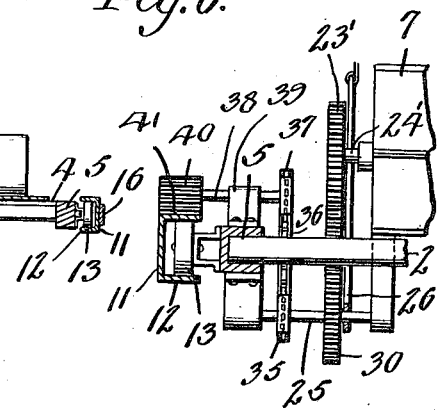

In the accompanying drawings: Figure 1 is a plan view of a one-wheeled tractor embodying the present invention showing the connection for a wheeled vehicle traveling in rear thereof and drawn thereby, Fig. 2 is a side elevation of the same. Fig. 3 is a vertical longitudinal section taken at right angles to the tractor wheel axle, showing the engagement between the motor supporting frame and the circular guide frame. Fig. 4 is a vertical cross section taken in line with the tractor wheel axle. Fig. 5 is a detail longitudinal section showing the steering mechanism in its relation to the engine shaft. Fig. 6 is a similar view showing the relation of the steering mechanism to the circular guide frame.

The tractor contemplated in this invention comprises essentially a tractor wheel 1 which in the preferred embodiment of the invention is arranged in front of the vehicle or farming implement to be drawn, said tractor wheel being mounted upon an axle 2 which passes through a frame 3 which extends entirely around the tractor wheel 1 diametrically thereof, the said frame 3 being connected by oblique braces 4 to the end portions of the axle at 5. The sections 3 and 4 of the motor supporting frame are thus designed to support a platform 6 upon which is mounted a motor 7 shown conventionally as of the internal combustion type. The motor 7 is geared to the tractor wheel 1 by any suitable means such as a sprocket chain 8 passing around a sprocket wheel 9 on the motor shaft and another sprocket wheel 10 either on the tractor wheel 1 or on the axle 2 where the latter is rotatable with the tractor wheel 1.

The tractor wheel and the frame surrounding the same are all contained within an annular or circular guide frame 11 which comprises top and bottom flanges 12 adapted to receive between them anti-friction rollers 13 journaled on the opposite extremities of the axle 2. Other rollers 14 are arranged at the opposite extremities of the frame section 3 and journaled in U-shaped brackets or holders 15 secured to said frame section. The rollers 14 like the rollers 13 operate between the flanges 12 of the circular guide frame 11. This admits of the free turning movement of the tractor wheel and the frame connected therewith in either direction for steering purposes.

The circular frame 11 is connected to the vehicle or implement traveling in rear thereof by means of shaft members A comprising front and rear sections 16 and 17, respectively, the same being in the form of bars which overlap each other and are provided with series of bolt holes 18 through which bolts 19 are inserted thus providing for lengthening and shortening the shaft members A to admit of the proper attachment of the vehicle to the tractor. Preferably, the shaft members A will connect with the axle of the vehicle or farming implement drawn by the tractor. Other lateral stays or braces B are interposed between the members A and the rear portion of the circular frame 11, said braces being longitudinally extensible by being made in overlapping and relatively adjustable sections as shown. At the rear of the circular frame 11 is a tongue socket 20 provided with suitable means for attaching thereto the tongue of the vehicle, machine or farming implement carried at the rear of the tractor. The construction just referred to enables the tractor as a whole to rise and fall in following undulations in the ground without affecting the machine in rear thereof. The shaft members A may be connected to the circular frame 11 at any desired number of points by means of clips 21 bolted or otherwise fastened thereto as at 22.

In order to provide for steering the tractor and turning the tractor wheel 1 to one side or the other, I provide the mechanism shown in Figs. 5 and 6 in which it will be seen that a spur gear wheel 23' is mounted fast on the engine shaft 24'. Below the engine shaft on a countershaft 24 there is mounted a rocker frame 26 comprising the oppositely arranged arms 27 and 28. Journaled on said rocker arm is a train of spur gear wheels 29, 30, 31 and 32 all of which are in mesh with each other. Suitable lines 33 and 34 are connected to the arms 27 and 28 and extend backwardly to the vehicle attached to the rear of the tractor so that by moving the rocker frame in one direction, the wheel 29 will be thrown into mesh with the wheel 23 to drive the shaft 25 in one direction and by moving said rocker frame in the opposite direction the wheel 32 will be moved into mesh with the wheel 23 thereby driving the shaft 25 in the opposite direction.

As shown in Fig. 6 the shaft 25 has mounted thereon a sprocket wheel 35 from which a sprocket chain 36 extends upwardly over another sprocket wheel 37 on a pinion shaft 38 journaled in a bearing 39 on the frame in which the shaft of the tractor wheel is journaled. Fast on the shaft 38 is a pinion 40 which meshes with teeth 41 on the upper face of the circular guide frame 11 as clearly shown in Fig. 1. It will now be seen that when the machine is in operation, the operator by moving the rocker frame 26 in one direction or the other may reverse the direction of rotation of the pinion 40 for the purpose of turning the circular guide frame 11 in one direction or the other, correspondingly turning the tractor wheel 1 for the purpose of steering the machine and at the same time driving the same in the desired direction.

What I claim is:—

Tractor mechanism comprising a normally horizontal non-rotating circular guide frame, a horizontal axle extending diametrically of said frame, rollers at the extremities of said axle working in contact with said frame, a traction wheel located centrally of said axle and frame, a motor-supporting frame supported by said axle, rollers on the last named frame working in contact with said circular guide frame, a motor carried by said motor-supporting frame and geared to said traction wheel, and steering means for turning the last named frame, comprising a train of wheels driven by the motor and adapted to engage said guide frame in such manner as to impart a turning movement to the motor-supporting frame in either direction.

In testimony whereof I affix my signature in presence of two witnesses.

CLARENCE G. FLEMING.

Witnesses:
Jos. E. STRAWN,
D. E. MAGNUSON.